Feb. 23, 1954
M. A. AMER
2,670,000
DISHWASHING MACHINE
Filed April 25, 1951
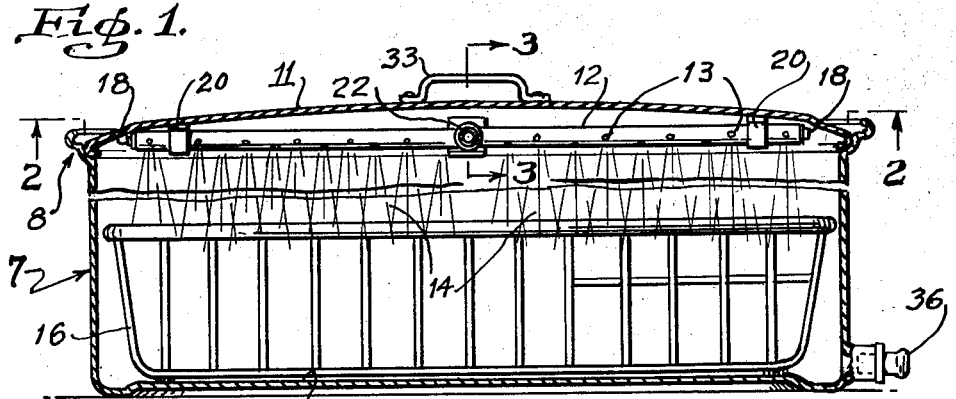
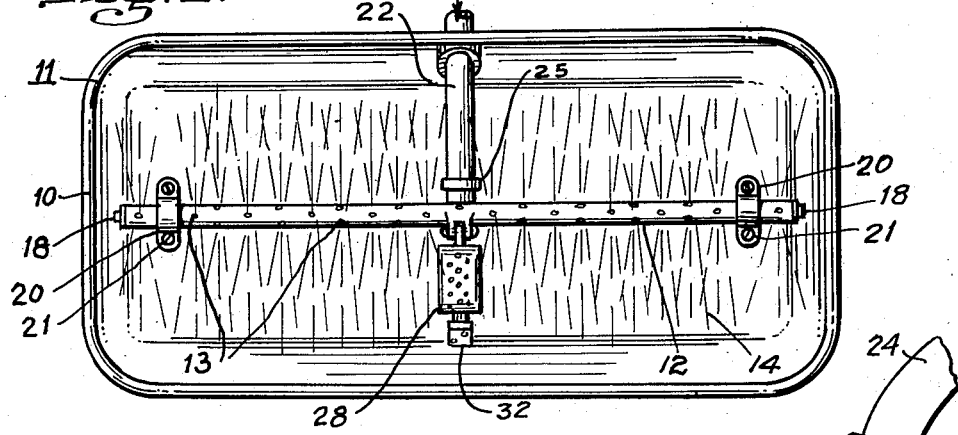
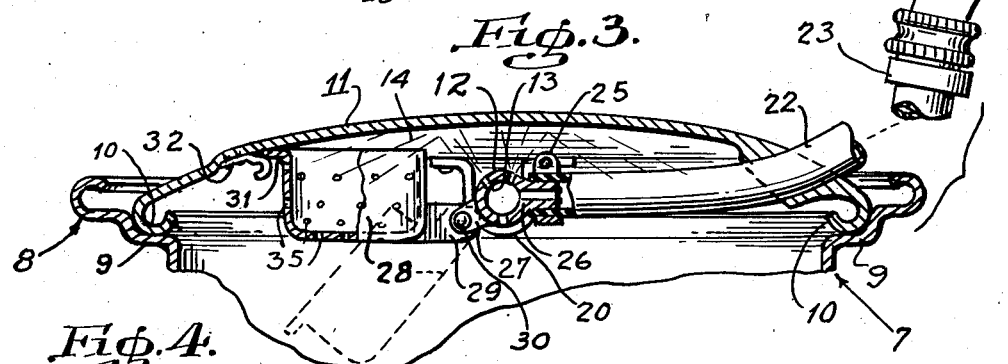
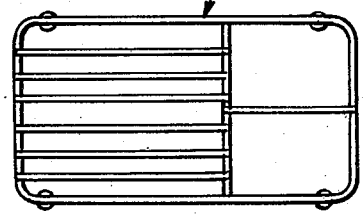
INVENTOR.
MYRTLE A. AMER
BY
Robt. D. Pearson
ATTORNEY.

Patented Feb. 23, 1954

2,670,000

UNITED STATES PATENT OFFICE 2,670,000

DISHWASHING MACHINE

Myrtle A. Amer, Long Beach, Calif.

Application April 25, 1951, Serial No. 222,854

1 Claim. (Cl. 134—177)

This invention relates to a dish washing machine of that class wherein a forcibly ejected spray of water is directed against the dishes to cleanse them.

More specifically, the present invention pertains to that type of dish washing machine wherein the dishes are cleansed by a liquid spray which is forcibly projected against them while they are supported in a container with their inner surface exposed to the spray.

It is an object of the invention to provide a simplified, more conveniently operable spraying device for directing the cleansing spray against the dishes.

A more specific object is to provide an improved, removable cover structure which carries the spraying device, which is attached to it, there being a liquid supply means which passes through said cover to supply liquid under pressure to said spraying device.

Another object is to provide an improved soap container or receptacle so related to the water or other liquid supply means that a part of the stream of spraying liquid passes continuously through said soap container and is, therefore, continuously supplied with soap.

Other objects, advantages and features of invention will hereinafter appear.

Referring to the accompanying drawing, which illustrates a preferred embodiment of the invention, Fig. 1 is a vertical, longitudinal section of the casing and cover portions of the machine, the contained parts being shown in side elevation. In order to contract the view a portion of the casing is broken out so as to lessen its vertical dimension.

Fig. 2 is a horizontal section looking up from the plane indicated by angular line 2—2 on Fig. 1. Both in Fig. 1 and in Fig. 2 sprays of water are indicated.

Fig. 3 is a fragmentary vertical section with parts in side elevation, the plane of section being indicated by line 3—3 on Fig. 1. The soap container is shown in full lines in its normal position and in broken lines in the refilling position.

Fig. 4 is a plan view separately showing the dish containing tray of Fig. 1, on a smaller scale.

Referring in detail to the drawing, the elongated approximately rectangular, as viewed in plan, sheet material container 7 is provided around its top with an outwardly and upwardly inclined flange 8 the lower part of which is stepped at 9 in order to provide a seat into which is fittable the marginal flange portion 10 of a removable cover 11. Said flange portion 10 is incurled as shown so as approximately to fit into the endless seat provided for it, as aforesaid.

In an underlying, secured relation to the cover 11 is a spraying tube 12 having through its side a multiplicity of spraying apertures 13 from which issue streams of spray 14, which for the most part are directed downwardly into dishes within a wire dish container 16 that rests upon the slightly raised bottom part 17 of the aforesaid container 7. Said spraying tube 7 is shown having a closure plug 18 in each end and secured to the cover by means of clips 20 having apertured end portions that receive fasteners shown as screws 21.

Said cover is slightly arched rearwardly throughout its length and from side to side, and said spraying tube, owing to the fact that it occupies the arched cover structure and is attached to each end thereof, considerably reinforces the sheet material of which the cover is made.

A hot water pressure supply conduit 22 passes through an apertured side portion of the cover, as best shown in Fig. 3, where is also shown a coupling 23 that attachably connects said tube with a main supply tube or faucet end 24. Said conduit 22 is desirably a flexible rubber tube. At its inner end it is attached by a clip 25 to a nipple 26 which projects laterally from the midlength part of the spray tube 12.

The side of the midlength portion of the spray tube 12 which is opposite to its nipple 26 is provided with a pair of pivot lugs 27 which swingably support a soap receptacle 28, the bottom portion of said cup having preferably integral therewith a lateral bottom extension 29 through which the pivot pin 30 passes. Diagonally opposite to said extension, that is to say at its free side, a latch tongue 31 projects and cooperates with a resilient arcuate catch member 32 secured to the adjacent part of the cover. When the cover is removed by the use of its handle 33 the operator can force the soap cup free from said catch 32 and after swinging the cup to the broken line position of Fig. 3 refill it with soap. Through the bottom and sides of said cup are outlet apertures 35. Said cup is spaced horizontally inward from one side of the container, where it functions well. Certain of the aforesaid spray outlets 13 direct parts of the spray upwardly against the cover 11 whence it is deflected back into the open mouth of said cup 28. The water, after having been forcibly sprayed onto the dishes contained in the already mentioned skeletal holder 16, flows continuously out through the outlet means 36, it being understood that the device will be supported upon the bottom of a kitchen sink or drain board during use.

The wire dish holder 16 may be of any approved type and hence need not be described in detail.

The device relates to a well developed art, and its complete operation will be readily understood from the foregoing description.

I claim:

In a dish washing machine of the dish spraying type, a horizontal elongated container to receive dishes and support them in a position to be washed, an elongated removable cover of form retaining sheet material normally seated in a detached manner upon and closing the top of said container, said cover being throughout slightly arched upwardly from side to side and from end to end, a horizontal spraying tube contained within the aforesaid arched part of the cover, means rigidly attaching the opposite end portions of said tube to the under side of opposite end portions of said cover so that said tube reinforces said cover, and a liquid supply means extending through said cover and communicating with said tube to supply a spraying liquid thereto under pressure, said liquid supply means, comprising a flexible conduit, which while connected with a fluid pressure supply unobstructs removal and replacement of said cover.

MYRTLE A. AMER.

References Cited in the file of this patent

UNITED STATES PATENTS

| Number | Name | Date |
|---|---|---|
| 1,142,187 | McGrath | June 8, 1915 |
| 1,429,069 | Dunn | Sept. 12, 1922 |
| 1,997,849 | Bargar | Apr. 16, 1935 |
| 2,184,204 | Walker | Dec. 19, 1939 |
| 2,218,869 | Bilde | Oct. 22, 1940 |
| 2,468,584 | Watring | Apr. 26, 1949 |